3,558,612
SUBSTITUTED PHENOXYACETIC ACIDS
Stephen J. Kuhn and Janet E. Ilavsky, Sarnia, Ontario, Canada, assignors to The Dow Chemical Company, Midland, Mich., a corporation of Delaware
No Drawing. Filed May 22, 1968, Ser. No. 731,292
Int. Cl. C07c 65/02; C07d 63/12
U.S. Cl. 260—240
10 Claims

ABSTRACT OF THE DISCLOSURE

Disclosed are aryl derivatives of 4-carbonylvinyl-phenoxyacetic acid wherein the aryl group is attached to the carbonyl function and represents naphthyl, thienyl, indanyl, phenyl, or substituted phenyl. These compounds are useful as pesticides.

---

The present invention relates to a novel and useful group of substituted phenoxyacetic acids. It more particularly is concerned with a new series of 4-(arylcarbonylvinyl)phenoxyacetic acids. These compounds can be represented by the Formula I:

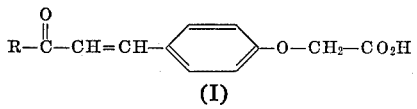

(I)

In this and succeeding formulas, R represents α-naphthyl, β-naphthyl, 2-thienyl, 5-indanyl, phenyl or substituted phenyl wherein the substituents are halo, loweralkyl and loweralkoxy.

In the present specification and claims, the term "halo" is employed to refer to chloro and bromo and the terms "loweralkyl" and "loweralkoxy" to refer to radicals containing from 1 to 2, to 3, to 4, and 1 and 2, and 3 and 4 carbon atoms, inclusive, that is methyl, ethyl, n-propyl, isopropyl, n-butyl, s-butyl, isobutyl, t-butyl, methoxy, ethoxy, n-propoxy, isopropoxy, and so forth. Representative substituted phenyl groups include halophenyl, loweralkylphenyl, loweralkoxyphenyl, haloloweralkylphenyl, haloloweralkoxyphenyl and loweralkylloweralkoxyphenyl such as 3-bromophenyl, 2,5-dichlorophenyl, 2,4,5-trichlorophenyl, 2,6 - dimethoxyphenyl, 2,4,6 - trimethoxyphenyl, 2,4,5-trimethylphenyl, 2-chloro-4-isobutylphenyl, 2,4-dichloro-6-methylphenyl, 2 - chloro - 4,6 - dimethoxyphenyl, 2-ethyl-4,6-dimethoxyphenyl, and 2-(n-butyl)-4-methylphenyl. 2-thienyl denotes the

group and 5-indanyl denotes the

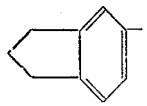

group.

The compounds of the present invention are crystalline solids and are soluble in many organic solvents. They are useful as pesticides for the control of a wide variety of pests such as the various plant attacking fungal organisms and insects pests such as flies and roaches, and parasite pests such as ascarids or other intestinal parasites.

Representative 4 - (arylcarbonylvinyl)phenoxyacetic acids include:

4-(2,4-dibromophenylcarbonylvinyl)phenoxyacetic acid
4-(2,4,6-trichlorophenylcarbonylvinyl)phenoxyacetic acid
4-(4-methylphenylcarbonylvinyl)phenoxyacetic acid
4-(2,4-dimethylphenylcarbonylvinyl)phenoxyacetic acid
4-(2-isopropylphenylcarbonylvinyl)phenoxyacetic acid
4-(2-methoxyphenylcarbonylvinyl)phenoxyacetic acid
4-(2,4,6-trimethoxyphenylcarbonylvinyl)phenoxyacetic acid
4-(4-(t-butoxy)phenylcarbonylvinyl)phenoxyacetic acid
4-(2-(n-butoxy)-4-bromophenylcarbonylvinyl)phenoxyacetic acid.
4-2-methyl-4-methoxyphenylcarbonylvinyl)phenoxyacetic acid, and
4-(2,5-dichloro14-ethylphenylcarbonylvinyl)phenoxyacetic acid.

The compounds of the present invention are prepared by reacting and condensing together 4-formyl-phenoxyacetic acid of the Formula II:

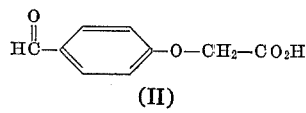

(II)

and an acetylaryl compound of the Formula III:

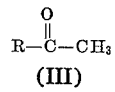

(III)

The reaction is conducted in the presence of an alkali metal hydroxide as catalyst, such as sodium hydroxide, potassium hydroxide, and lithium hydroxide, and conveniently in a liquid reaction medium such as can be provided by any of a wide variety of organic solvents or mixtures thereof, for example, alkanols (ethanol, methanol), amides (dimethylformamide), water, and other polar, inert solvents. The amounts of the reactants to be employed are not critical, some of the product being formed when employing any proportions. The reaction consumes the reactants, however, in the ratio of one mole of the 4-formylphenoxyacetic acid per mole of acetylaryl compound and the employment of such proportions is preferred.

Since the alkali metal hydroxide reacts with the 4-formylphenoxyacetic acid reactant, it is critical that a small amount in excess of alkali metal hydroxide be employed per mole of formylphenoxyacetic acid in order to provide a catalytic amount of catalyst. Preferably, the alkali metal hydroxide is employed in amounts of 10 mole percent excess or more, and preferably up to about a 50 mole percent excess. A large excess does not interfere with the reaction but is undesirable from the standpoint of economy.

In carrying out this reaction, the formylphenoxyacetic acid, acetylaryl compound, alkali metal hydroxide, and solvent, if employed, are contacted and maintained together in any convenient fashion. In one manner, the alkali metal hydroxide is added to a solution of the formylphenoxyacetic acid and acetylaryl compound. The reaction is allowed to proceed at room temperature or with slight heating up to about 100° C., preferably, from about 20° to 50° C. and with stirring. After a period of time sufficient to produce the desired product has elapsed, the reaction mixture is neutralized with a dilute acid solution and thereafter conventionally treated to isolate the product. Such conventional procedures include filtration, recrystallization and the like.

The following examples serve further to illustrate the invention and the manner by which it can be practiced but, as such, should not be construed as limitations upon the overall scope hereof.

EXAMPLE 1

4-formylphenoxyacetic acid (9.0 grams; 0.05 mole) and 4-bromoacetophenone (9.9 grams; 0.06 mole) are dispersed in 50 milliliters of ethanol with stirring at room temperature. While vigorous stirring is continued at room temperature, 30 milliliters of a 10 percent aqueous sodium hydroxide (0.075 mole of sodium hydroxide) are added to the reaction mixture and the stirring is continued for an additional 15 minutes following the addition. The reaction mixture is then acidified with dilute hydrochloric acid which initiates precipitation. The precipitated yellow crystals are separated on a sintered glass filter and washed with four 50 milliliter portions of warm water and one 50 milliliter portion of methanol. The crystals are allowed to dry and are then recrystallized from boiling dimethylformamide (153° C.) to obtain the desired 4-(4-bromophenylcarbonylvinyl)phenoxyacetic acid product as pale yellow crystals melting at 222°–226° C.

*Elemental analysis.*—Calculated for $C_{17}H_{13}BrO_4$ (percent): C, 56.5; H, 3.63. Found (percent): C, 56.3; H, 3.71.

EXAMPLE 2

4-formylphenoxyacetic acid (9 grams; 0.05 mole) and 4-bromoacetophenone (9.9 grams; 0.05 mole) are dispersed in and mixed with 75 milliliters of ethanol at room temperature. Thereafter 25 milliliters of a 10 percent aqueous sodium hydroxide solution (0.063 mole of sodium hydroxide) are added with stirring. After the addition of the first 10 milliliters, a fine white solid precipitates, followed by a yellow suspension resulting when the final 15 milliliters of solution are added. Following the addition, the mixture is stirred for 15 minutes and then neutralized with a 10 percent hydrogen chloride solution which precipitates a solid. The resulting yellow solid is separated on a sintered glass filter, washed successively with water and methanol, and recrystallized from boiling dimethylformamide to obtain the desired 4-(4-ethoxyphenylcarbonylvinyl)phenoxyacetic acid product as yellow crystals melting at 170°–173° C.

*Elemental analysis.*—Calculated for $C_{19}H_{18}O_5$ (percent): C, 69.9; H, 5.56. Found (percent): C, 70.6; H, 5.67.

EXAMPLE 3

Nine grams (0.05 mole) of 4-formylphenoxyacetic acid and 8.5 grams (0.05 mole) of 1-acetylnaphthalene are dispersed in and mixed with 100 milliliters of ethanol at room temperature. While stirring the resultant solution, 42 milliliters of a 10 percent aqueous potassium hydroxide solution (0.075 mole potassium hydroxide) are added to the mixture. After stirring the resultant mixture for 15 minutes following the addition, the reaction mixture solidifies. To the solid mass are added 50 milliliters of water and the mixture is stirred for 2 minutes to obtain a homogeneous suspension. The suspension is acidified with a 10 percent hydrochloric acid solution which precipitates a solid. The solid is filtered and washed with water. The washed precipitate is dried and recrystallized from dimethylformamide to obtain the desired 4-(2-naphthylcarbonylvinyl)phenoxyacetic acid product as yellow crystals melting at 175°–178° C.

*Elemental analysis.*—Calculated for $C_{21}H_{16}O_4$ (percent): C, 75.9; H, 4.85. Found (percent): C, 75.9; H, 4.76.

In a similar manner, other compounds of the present invention are prepared as follows:

4-(phenylcarbonylvinyl)phenoxyacetic acid as pale yellow crystals melting at 184°–187° C. by reacting together 4-formylphenoxyacetic acid and acetophenone.

4-(1-naphthylcarbonylvinyl)phenoxyacetic acid which has a molecular weight of 332.3 by reacting together 4-formylphenoxyacetic acid and 2-acetylnaphthalene.

4-(4-chlorophenylcarbonylvinyl)phenoxyacetic acid as pale yellow crystals melting at 221°–225° C. by reacting together 4-formylphenoxyacetic acid and 4-chloroacetophenone.

4-(4-(n-propyl)phenylcarbonylvinyl)phenoxyacetic acid which has a molecular weight of 324.4 by reacting together 4-formylphenoxyacetic acid and 4-(n-propyl)-acetophenone.

4-(3,4-dichlorophenylcarbonylvinyl)phenoxyacetic acid as yellow crystals melting at 196°–198° C. by reacting together 4-formylphenoxyacetic acid and 3,4-dichloroacetophenone.

4-(2,4-diethylphenylcarbonylvinyl)phenoxyacetic acid which has a molecular weight of 338.4 by reacting together 4-formylphenoxyacetic acid and 2,4-diethylacetophenone.

4-(4-ethylphenylcarbonylvinyl)phenoxyacetic acid as pale yellow crystals melting at 177°–180° C. by reacting together 4-formylphenoxyacetic acid and 4-ethylacetophenone.

4-(2-chloro - 4 - ethylphenylcarbonylvinyl)phenoxyacetic acid which has a molecular weight of 344.8 by reacting together 4-formylphenoxyacetic acid and 2-chloro-4-ethylacetophenone.

4-(2-thienylcarbonylvinyl)phenoxyacetic acid as pale yellow crystals melting at 183°–187° C. by reacting together 4-formylphenoxyacetic acid and 2-acetylthiophene.

4-(2-bromo - 4 - isopropoxyphenylcarbonylvinyl)-phenoxyacetic acid which has a molecular weight of 419.3 by reacting together 4-formylphenoxyacetic acid and 2-bromo-4-isopropoxyacetophenone.

4-(5-indanylcarbonylvinyl)phenoxyacetic acid as pale yellow crystals melting at 205°–208° C. by reacting together 4-formylphenoxyacetic acid and 5-acetylindane.

The compounds of the present invention are useful as pesticides for the control of a wide variety of fungal, insect, and parasite pests, such as the causative agents of apple scab and tomato late blight, *Bacillus subtilis,* and beetles and roaches, and worms, ascarids, trichostrongyloids, hookworms, pinworms, screwworms and cattle grubs. For such use, the unmodified compounds can be employed. Alternatively, the compounds can be dispersed in an edible solid to prepare animal feed compositions or on an inert finely divided solid to prepare dust compositions. The latter dust compositions can be dispersed in water with or without the aid of a wetting agent, the resulting aqueous dispersion employed as sprays. In other procedures, the compounds can be employed as a constituent in edible oils or in other oils or solvents or as a constituent in solvent-in-water or water-in-solvent emulsions or dispersions which can be employed as sprays, drenches or washes. Good results are obtained when employing compositions containing pesticidal concentrations and usually from about 50 to 10,000 parts per million by weight of one or more of the compounds.

In representative operations, aqueous compositions containing 500 parts per million by weight of one of 4-(3,4 - dichlorophenylcarbonylvinyl)phenoxyacetic acid, 4 - (5 - indanylcarbonylvinyl)phenoxyacetic acid, 4-(4-ethylphenylcarbonylvinyl)phenoxyacetic acid, 4 - (2-thienylcarbonylvinyl)phenoxyacetic acid, and 4-(4-ethoxyphenylcarbonylvinyl)phenoxyacetic acid each give good controls and kills of American cockroaches.

In further operations, a series of animal feed compositions each containing 0.06 percent by weight of 4-(4-ethoxyphenylcarbonylvinyl)phenoxyacetic acid give substantially complete controls and kills of ascarids, hookworms, trichostrongyloids and tapeworms when separately employed as the diets for mice infested with such internal parasites.

In still further operations, aqueous compositions containing 500 parts per million by weight of one of 4-(3,4-dichlorophenylcarbonylvinyl)phenoxyacetic acid, 4 - (5-indanylcarbonylvinyl)phenoxyacetic acid, 4-(2-naphthylcarbonylvinyl)phenoxyacetic acid, and 4-(4-ethylphenylcarbonylvinyl)phenoxyacetic acid each give substantially complete controls and kills of the organism *Bacillus subtilis* when they are separately applied to agar supports containing thriving colonies of such organism.

The starting compound, 4-formylphenoxyacetic acid, is a known compound and can be prepared in accordance with known procedures. In one manner, the sodium salt of p-hydroxybenzaldehyde is formed and reacted with sodium 2-chloroacetate with slight heating. The reaction mixture is treated with a sodium bicarbonate solution and, thereafter, the product 4-formylphenoxyacetic acid is precipitated by the addition of hydrochloric acid to the reaction mixture. It can then be recovered by filtration. Acetophenone and its substituted derivatives are likewise known compounds and can be prepared in accordance with known methods. The synthesis of these ketones satisfactorily follows via a Friedel & Crafts reaction. For example, acetic anhydride and benzene are reacted together in the presence of aluminum chloride as one excellent manner of preparing acetophenone.

What is claimed is:
1. The compound corresponding to the formula

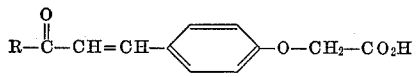

wherein R is α-naphthyl, β-naphthyl, 2-thienyl, 5-indanyl, phenyl, and substituted phenyl wherein the substituents are halo, loweralkyl, and loweralkoxy.

2. The compound claimed in claim 1 which is 4-(phenylcarbonylvinyl)phenoxyacetic acid.

3. The compound claimed in claim 1 which is 4-(4-chlorophenylcarbonylvinyl)phenoxyacetic acid.

4. The compound claimed in claim 1 which is 4-(4-bromophenylcarbonylvinyl)phenoxyacetic acid.

5. The compound claimed in claim 1 which is 4-(3,4-dichlorophenylcarbonylvinyl)phenoxyacetic acid.

6. The compound claimed in claim 1 which is 4-(4-ethylphenylcarbonylvinyl)phenoxyacetic acid.

7. The compound claimed in claim 1 which is 4-(4-ethoxyphenylcarbonylvinyl)phenoxyacetic acid.

8. The compound claimed in claim 1 which is 4-(2-naphthylcarbonylvinyl)phenoxyacetic acid.

9. The compound claimed in claim 1 which is 4-(2-thienylcarbonylvinyl)phenoxyacetic acid.

10. The compound claimed in claim 1 which is 4-(5-indanylcarbonylvinyl)phenoxyacetic acid.

References Cited

UNITED STATES PATENTS 3,255,241  6/1966  Schultz et al. _____ 260—520X

JOHN D. RANDOLPH, Primary Examiner

U.S. Cl. X.R.

260—520, 999; 99—2

PO-1050
(5/69)

UNITED STATES PATENT OFFICE
CERTIFICATE OF CORRECTION

Patent No. 3,558,612                     Dated 26 Jan. 1971

Inventor(s)   Stephen J. Kuhn and Janet E. Ilavsky

It is certified that error appears in the above-identified patent and that said Letters Patent are hereby corrected as shown below:

In column 2, line 73, change "0.06" to -- 0.05 --.

In column 3, Example 2, line 22, delete "4-bromoacetophenone (9.9 grams; 0.05 mole)" and insert -- 4-ethoxyacetophenone (8.2 grams; 0.05 mole) -- .

Signed and sealed this 25th day of May 1971.

(SEAL)
Attest:

EDWARD M. FLETCHER, JR.            WILLIAM E. SCHUYLER, J
Attesting Officer                  Commissioner of Patent